(12) United States Patent
Wu (10) Patent No.: US 8,706,129 B2
(45) Date of Patent: Apr. 22, 2014

(54) METHOD OF IMPROVING SEMI-PERSISTENT SCHEDULING RESOURCES RECONFIGURATION IN A WIRELESS COMMUNICATION SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 586 days.

(21) Appl. No.: 12/603,549

(22) Filed: Oct. 21, 2009

(65) Prior Publication Data

US 2010/0113058 A1 May 6, 2010

Related U.S. Application Data

(60) Provisional application No. 61/109,907, filed on Oct. 30, 2008.

(51) Int. Cl.
- *H04W 72/00* (2009.01)
- *H04W 36/00* (2009.01)
- *H04W 4/00* (2009.01)

(52) U.S. Cl.
USPC .................. 455/452.1; 370/329; 455/436

(58) Field of Classification Search
USPC .................. 455/450, 452.2; 370/329
See application file for complete search history.

(56) References Cited

U.S. PATENT DOCUMENTS

| 6,983,147 | B1 * | 1/2006 | Hans et al. ................. 455/436 |
| 8,009,606 | B2 * | 8/2011 | Seo et al. ................... 370/319 |
| 2008/0192688 | A1 | 8/2008 | Kuo | |
| 2010/0081443 | A1 * | 4/2010 | Meyer et al. ............... 455/450 |
| 2010/0085927 | A1 * | 4/2010 | Torsner et al. ............. 370/329 |
| 2010/0279695 | A1 * | 11/2010 | Amirijoo et al. .......... 455/438 |
| 2011/0002262 | A1 * | 1/2011 | Wang et al. ................ 370/328 |
| 2011/0223924 | A1 * | 9/2011 | Lohr et al. ................. 455/450 |
| 2012/0207083 | A1 * | 8/2012 | Chen et al. ................. 370/315 |

FOREIGN PATENT DOCUMENTS

| CN | 101155393 A | 4/2008 |
| CN | 101193444 A | 6/2008 |
| WO | 2006114701 A2 | 11/2006 |

OTHER PUBLICATIONS

Nokia Corporation, Missing details of semi-persistent scheduling for DL, Sep. 29-Oct. 3, 2008, 3GPP TSG-RAN WG2 Meeting, R2-085071, pp. 1-6.*
Nokia Corporation, Missing details of semi-persistent scheduling for UL, Sep. 29-Oct. 3, 2008, 3GPP TSG-RAN WG2 eeting, R2-085070, pp. 1-3.*
Nokia Corporation, Explicit Release of SPS Change Request, Oct. 10-14, 2008, 3GPP TSG-RAN2 Meeting #64, xR2-087024, pp. 1-3.*
3GPP, 3GPP TS 36.331 v8.3.0, Sep. 2008.
3GPP, 3GPP TSG-RAN2#63bis R2-085978, Sep. 2008.
3GPP, 3GPP TSG-RAN2#63bis R2-085978-clean, Sep. 2008.
Office action mailed on Aug. 15, 2011 for the China application No. 200910208948.5, filed Oct. 30, 2009, p. 1-6.

(Continued)

*Primary Examiner* — Kent Chang
*Assistant Examiner* — Nathan Brittingham
(74) *Attorney, Agent, or Firm* — Winston Hsu; Scott Margo (57) ABSTRACT

A method of improving SPS reconfiguration for a user equipment in a wireless communication system includes receiving an RRC connection reconfiguration message and reconfiguring SPS resources in accordance with an SPS resources configuration IE when the SPS resources configuration IE is included in the RRC connection reconfiguration message and is set enable.

8 Claims, 6 Drawing Sheets

(56) References Cited

OTHER PUBLICATIONS

Huawei, "Clarification on handling of RRCConnectionReconfiguration including the mobilityControlInformation", 3GPP TSG RAN WG2 #63, R2-084329, Aug. 18-Aug. 22, 2008, Jeju, Korea.

Panasonic: "Dedicated L1 resource usage after handover", Jun. 30-Jul. 4, 2008, 3GPP TSG RAN WG2 #62bis, R2-083694, XP050141020, Warsaw, Poland.

Panasonic: "Configuration for semi-persistent scheduling", Mar. 31-Apr. 4, 2008, 3GPP TSG RAN WG2 #61bis, R2-081575, XP050139309, Shenzhen, China.

Ericsson: "Configuration of semi-persistent scheduling", Jan. 14-18, 2008, 3GPP TSG-RAN WG2 Meeting #60bis, Tdoc R2-080088, XP050137981.

Nokia Corporation, Nokia Siemens Networks: "Indication of persistent allocation for UL", Mar. 31-Apr. 4, 2008, 3GPP TSG-RAN WG2 Meeting #61bis, R2-081962, XP050139630, Shenzhen, China.

Office action mailed on Jul. 20, 2012 for the U.S. Appl. No. 13/419,444, filed Mar. 14, 2012, p. 1-10.

Office action mailed on Mar. 7, 2013 for the China application No. 200910208948.5, filed Oct. 30, 2009, p. 1-8.

\* cited by examiner

METHOD OF IMPROVING SEMI-PERSISTENT SCHEDULING RESOURCES RECONFIGURATION IN A WIRELESS COMMUNICATION SYSTEM AND RELATED COMMUNICATION DEVICE

CROSS REFERENCE TO RELATED APPLICATIONS

This application claims the benefit of U.S. Provisional Application No. 61/109,907, filed on Oct. 30, 2008 and entitled "METHOD AND APPARATUS FOR SEMI-PERSISTENT SCHEDULING RESOURCE RECONFIGURATION IN A WIRELESS COMMUNICATIONS SYSTEM", the contents of which are incorporated herein.

BACKGROUND OF THE INVENTION

1. Field of the Invention

The present invention relates to a method utilized in a wireless communication system and communication device thereof, and more particularly, to a method of improving semi-persistent scheduling resources reconfiguration and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of E-UTRAN is given including a radio resource control layer (RRC), a packet data convergence protocol layer (PDCP), a radio link control layer (RLC), a medium access control layer (MAC), and a physical layer (PHY).

In order to utilize shared channel (SCH) resources efficiently, a semi-persistent scheduling (SPS) function is introduced in the LTE system and is used in MAC, for serving upper layer applications which generate semi-static size data periodically, e.g. VoIP services. SPS resources are semi-static resources including physical resource block (PRB), modulation and coding scheme (MCS), and periodicity. Periodicity is configured by RRC, and a valid set of PRBs and MCSs is configured by RRC and selected by a physical downlink control channel (PDCCH) signaling sent from the E-UTRAN. According to current 3GPP specification, there is only an SPS pattern, i.e. periodicity, for frequency division duplex (FDD), and may exist multiple SPS patterns for time division duplex (TDD) so that SPS resources can be reconfigured to add one more SPS pattern.

An RRC connection reconfiguration procedure is used to modify an RRC connection, e.g. to establish/modify/release radio bearers, to perform handover, or to setup/modify/release measurements. When the UE receives an RRC connection reconfiguration message including an information element (IE) "mobilityControlInformation", which includes parameters relevant to network controlled mobility, the UE performs an RRC connection reconfiguration procedure as a handover procedure. In the handover procedure, the UE deactivates any SPS resource if there is any SPS resource active and performs a radio resource configuration procedure in which SPS resources reconfiguration is performed when the RRC connection reconfiguration message includes an IE "radioResourceConfiguration". Therefore, the UE can apply new SPS resources configuration after switching to a target cell. SPS resources reconfiguration intends that SPS cell radio network temporary identifier (SPS C-RNTI) which is the UE specific identity assigned by RRC for activation/modification of SPS resources is changed, periodicity is changed, an SPS pattern is added or removed for TDD, or a valid set of PRBs and MCSs is changed.

In addition, SPS resources may need to be reconfigured due to which a new service is activated or a service is released in the condition except the handover procedure. For example, when a VoIP service is initiated, SPS resources are usually configured for most common VoIP packet size, and when a streaming service is activated during the VoIP service, SPS resources have to be reconfigured with a large transport block size, i.e. PRBs or MCS, or a small SPS periodicity, to serve both the VoIP service and the streaming service simultaneously. The E-UTRAN can activate or modify SPS resources by sending a PDCCH signaling including SPS C-RNTI. However, SPS resources reconfiguration is not clearly specified in the RRC connection reconfiguration procedure which does not include the IE "mobilityControlInformation", such that SPS resources reconfiguration is exactly performed only in the handover procedure.

Note that, for the LTE system, there is a timing issue that activation time of SPS resources is not included in any RRC message, and thus the UE does not know when to switch to new SPS resources. When the UE reconfigures SPS resources in the condition except the handover procedure, the UE may continue using prior SPS resources that are already released to receive transport blocks until receiving the PDCCH signaling, which causes the received transport blocks to be unsuccessfully decoded.

SUMMARY OF THE INVENTION

The present invention therefore provides a method and related communication device for improving SPS resources reconfiguration.

The present invention discloses a method of improving SPS resources reconfiguration for a UE in a wireless communication system, including receiving an RRC connection reconfiguration message and reconfiguring SPS resources in accordance with an SPS resources configuration IE when the SPS resources configuration IE is included in the RRC connection reconfiguration message and SPS resources configuration is set enable.

The present invention further discloses a communication device of a wireless communication system for improving SPS resources reconfiguration. The communication device includes a computer readable recording medium, for storing program code corresponding to a process, and a processor that is coupled to the computer readable recording medium and is used for processing the program code to execute the process. The process includes receiving an RRC connection reconfiguration message and reconfiguring SPS resources in accordance with an SPS resources configuration IE when the SPS resources configuration IE is included in the RRC connection reconfiguration message and SPS resources configuration is set enable.

The present invention further discloses a method of improving SPS resources reconfiguration for a UE in a wireless communication system, including receiving a radio resource control, abbreviated to RRC, connection reconfiguration message corresponding to an RRC connection reconfiguration procedure and forbidding performing SPS resources reconfiguration when the RRC connection reconfiguration procedure is not a handover procedure.

The present invention further discloses a method of improving SPS resources reconfiguration for a UE in a wireless communication system, including receiving an RRC connection reconfiguration message corresponding to an RRC connection reconfiguration procedure, and when the RRC connection reconfiguration message includes SPS resources reconfiguration and the RRC connection reconfiguration procedure is not a handover procedure, considering the RRC connection reconfiguration message invalid and performing an RRC connection re-establishment procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
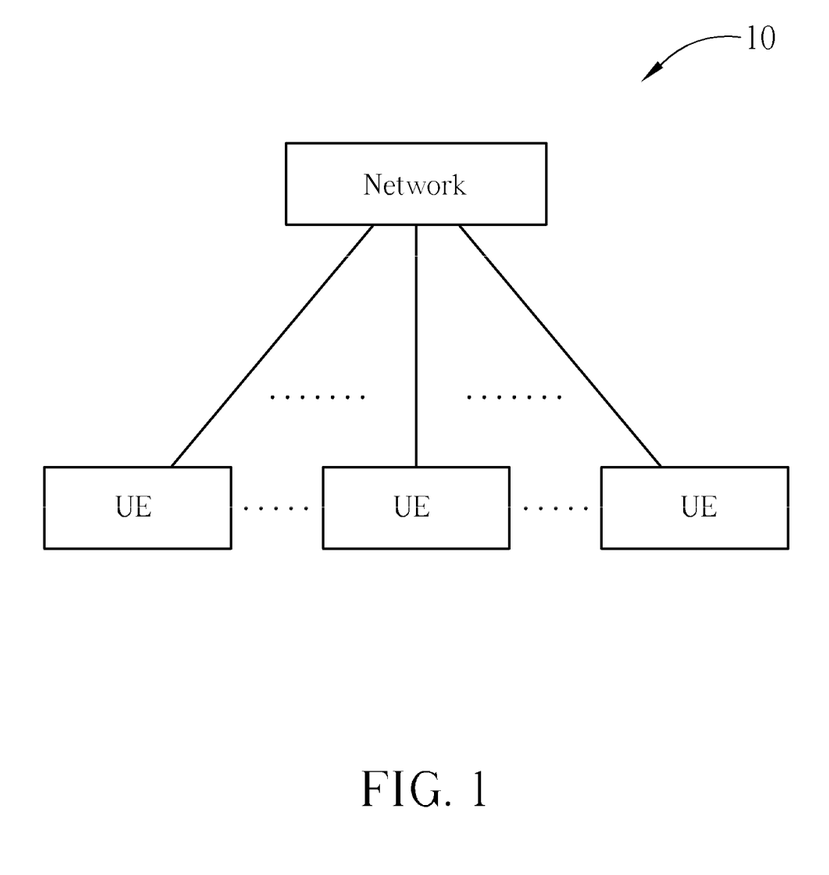
FIG. 1 is a schematic diagram of a wireless communication system.

Please refer to FIG. 1, which is a schematic diagram of a wireless communication system 10. The wireless communication system 10 can a long-term evolution (LTE) system or other mobile communication systems, and is briefly composed of a network and a plurality of user equipments (UEs), as the structure illustrated in FIG. 1. In the LTE system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
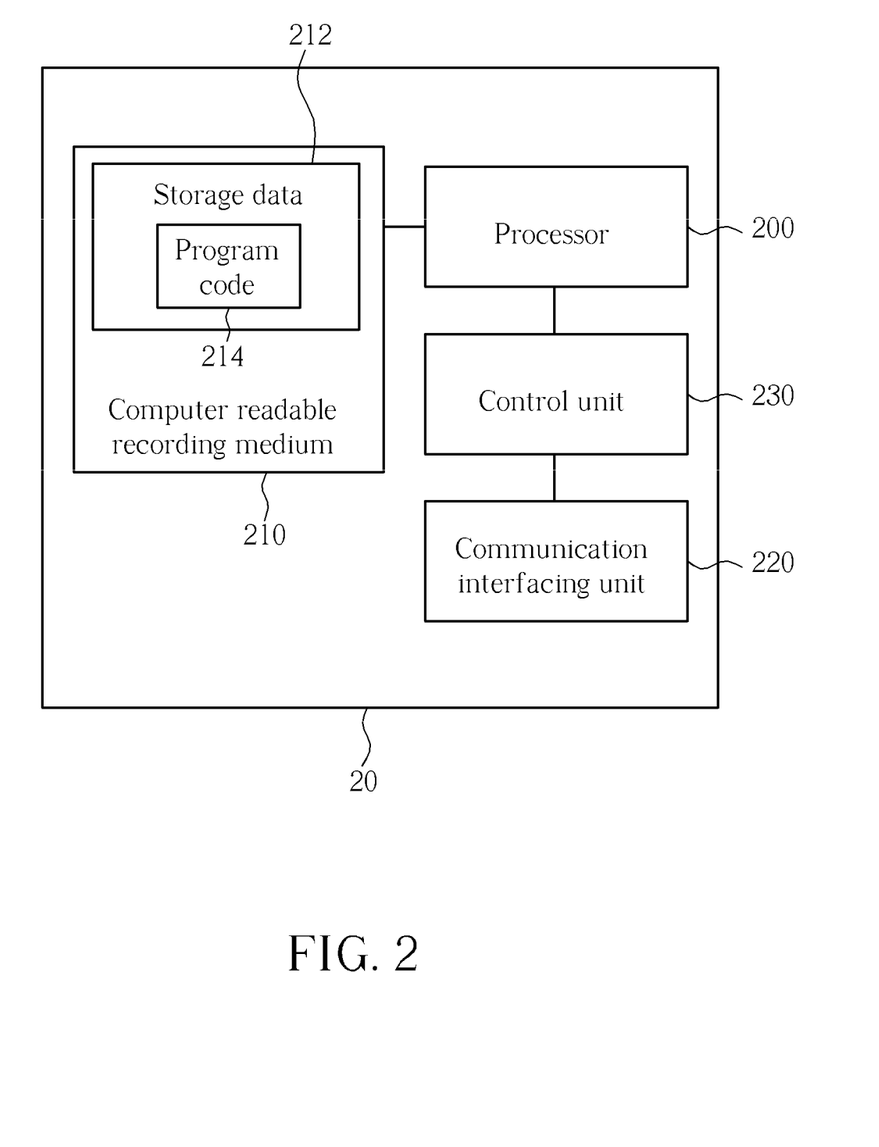
FIG. 2 is a schematic diagram of a communication device according to an example of the present invention.

Please refer to FIG. 2, which is a schematic diagram of a communication device 20 according to an example of the present invention. The communication device 20 can be the UE shown in FIG. 1 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 3:
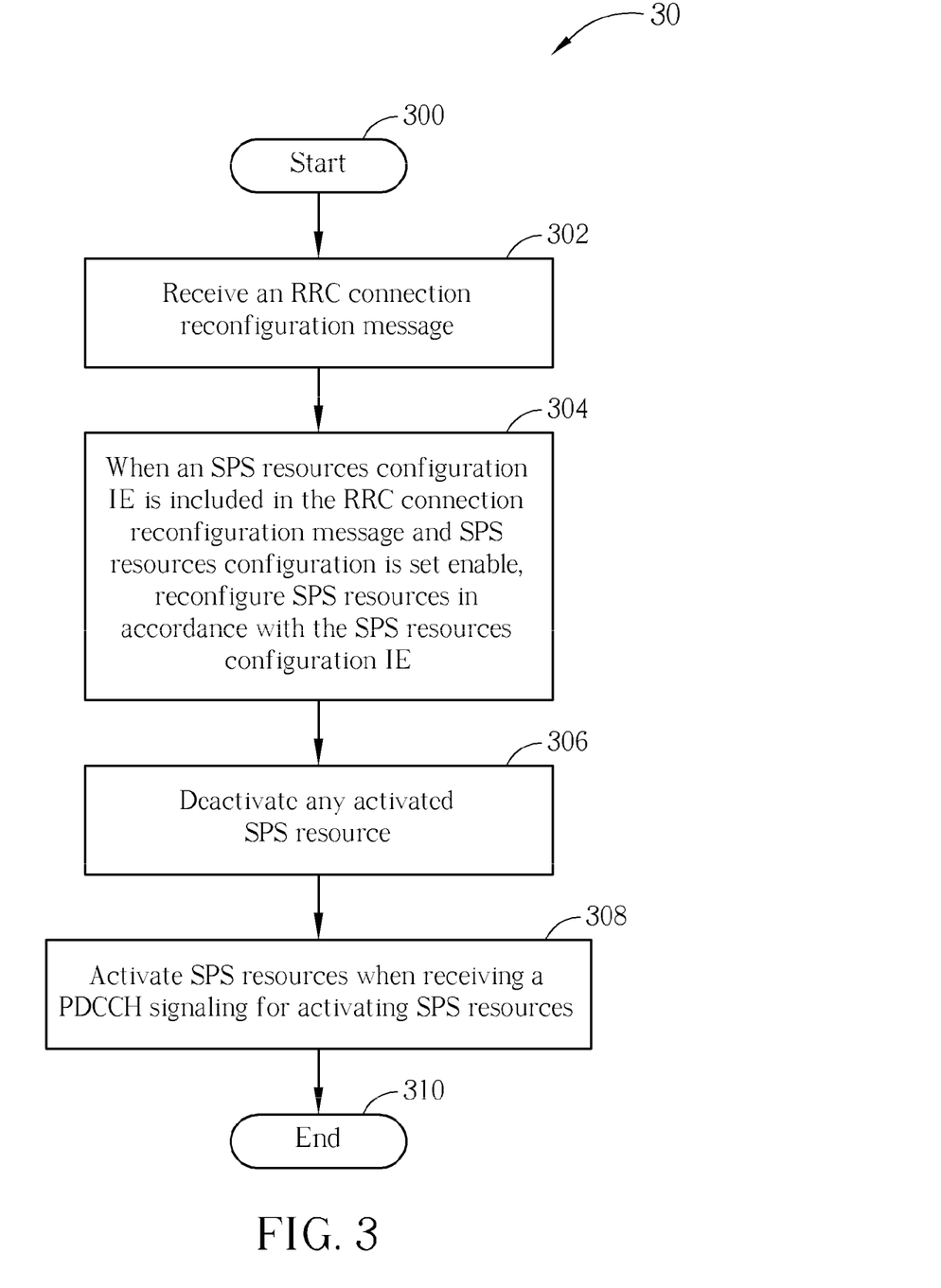
FIG. 3 to FIG. 6 are flowcharts of processes according to examples of the present invention.

As mentioned previously, activation time of semi-persistent scheduling (SPS) resources is not included in any RRC message such that it is hard to decide for a UE when to switch to new SPS resources; also, SPS resources reconfiguration is not clearly specified in current specification. Please refer to FIG. 3, which is a flowchart of a process 30 according to an example of the present invention. The process 30 is utilized for improving SPS resources reconfiguration for a UE in the wireless communication system 10 and can be compiled into the program code 214. The process 30 includes the following steps:

Step 300: Start.

Step 302: Receive an RRC connection reconfiguration message.

Step 304: When an SPS resources configuration IE is included in the RRC connection reconfiguration message and SPS resources configuration is set enable, reconfigure SPS resources in accordance with the SPS resources configuration IE.

Step 306: Deactivate any activated SPS resource.

Step 308: Activate SPS resources when receiving a PDCCH signaling for activating SPS resources.

Step 310: End.

The process 30 is utilized in downlink and uplink SPS resources reconfiguration. The SPS resources configuration IE can be as a downlink SPS resources configuration IE for specifying downlink SPS resources configuration, or be an uplink SPS resources configuration IE for specifying uplink SPS resources configuration. Precisely, Step 304 intends that the UE reconfigures downlink SPS resources according to the SPS resources configuration IE (which is the downlink SPS resources configuration IE) when the SPS resources configuration IE is included in the RRC connection reconfiguration message and SPS resources configuration is set enable, and also reconfigures uplink SPS resources according to the SPS resources configuration IE (which is the uplink SPS resources configuration IE) when the SPS resources configuration IE is included in the RRC connection reconfiguration message and SPS resources configuration is set enable.

In other words, when the SPS resources configuration IE, whatever the downlink SPS resources configuration IE or the uplink SPS resources configuration IE it is, is included in the received RRC connection reconfiguration message and SPS resources configuration is set enable, the UE reconfigures SPS resources according to the SPS resources configuration IE. After SPS resources are reconfigured, according to Step 306, the UE deactivates any uplink/downlink SPS resource that is already activated; and, according to Step 308, the UE activates uplink/downlink SPS resources when the UE receives a PDCCH signaling for activating uplink/downlink SPS resources. Through the process 30, new downlink or uplink SPS resources configuration can be activated by a PDCCH signaling later, and on-going SPS retransmission using prior SPS resources configuration is aborted.

Downlink SPS resources are a little different from uplink SPS resources. Downlink SPS resources comprise a valid set of physical radio blocks (PRBs) and modulation and coding schemes (MCSs), physical uplink control channel (PUCCH) resources for hybrid automatic repeat request (HARQ) acknowledgement (ACK) or non-acknowledgement (NACK) message, a periodicity for frequency division duplex (FDD), and SPS patterns for time division duplex (TDD). Uplink SPS resources comprise a valid set of PRBs and MCSs, parameters for physical uplink shared channel (PUSCH) power control, a periodicity for FDD, and SPS patterns for TDD.

The following is an example of modified specification according to the process 30. When the received RRC connection reconfiguration message includes an IE "radioResourceConfiguration" including an IE "sps-Configuration" including an IE "sps-ConfigurationDL" (which represents the downlink SPS resources configuration IE in the process 30) and the IE "sps-ConfigurationDL" is set to "enable", the UE reconfigures downlink SPS resources according to the received IE "sps-ConfigurationDL". Similarly, when the received RRC connection reconfiguration message includes the IE "radioResourceConfiguration" including the IE "sps-Configuration" including an IE "sps-ConfigurationUL" (which represents the uplink SPS resources configuration IE in the process 30) and the IE "sps-ConfigurationUL" is set to "enable", the UE reconfigures uplink SPS resources according to the received IE "sps-ConfigurationUL". Therefore, downlink/uplink SPS resource as periodicity is reconfigured by the IE "sps-ConfigurationDL" or the IE "sps-ConfigurationUL".

In the prior art, SPS resources reconfiguration is not clearly specified. In comparison, the present invention clearly defines SPS resources reconfiguration in the RRC connection reconfiguration procedure, and therefore SPS resources reconfiguration is performed whether the IE "mobilityControlInformation" is included in the RRC connection reconfiguration message after receiving the RRC connection reconfiguration message. Through the process 30, SPS resources reconfiguration is also performed in the non-handover RRC connection reconfiguration procedure.

Note that, in another example of the present invention, after the UE performs Step 302 and Step 304, instead of Step 306 and Step 308, the UE may continue using the prior (activated) uplink/downlink SPS resources configuration until receiving the PDCCH signaling for activating new uplink/downlink SPS resources configuration.

Figure 4:
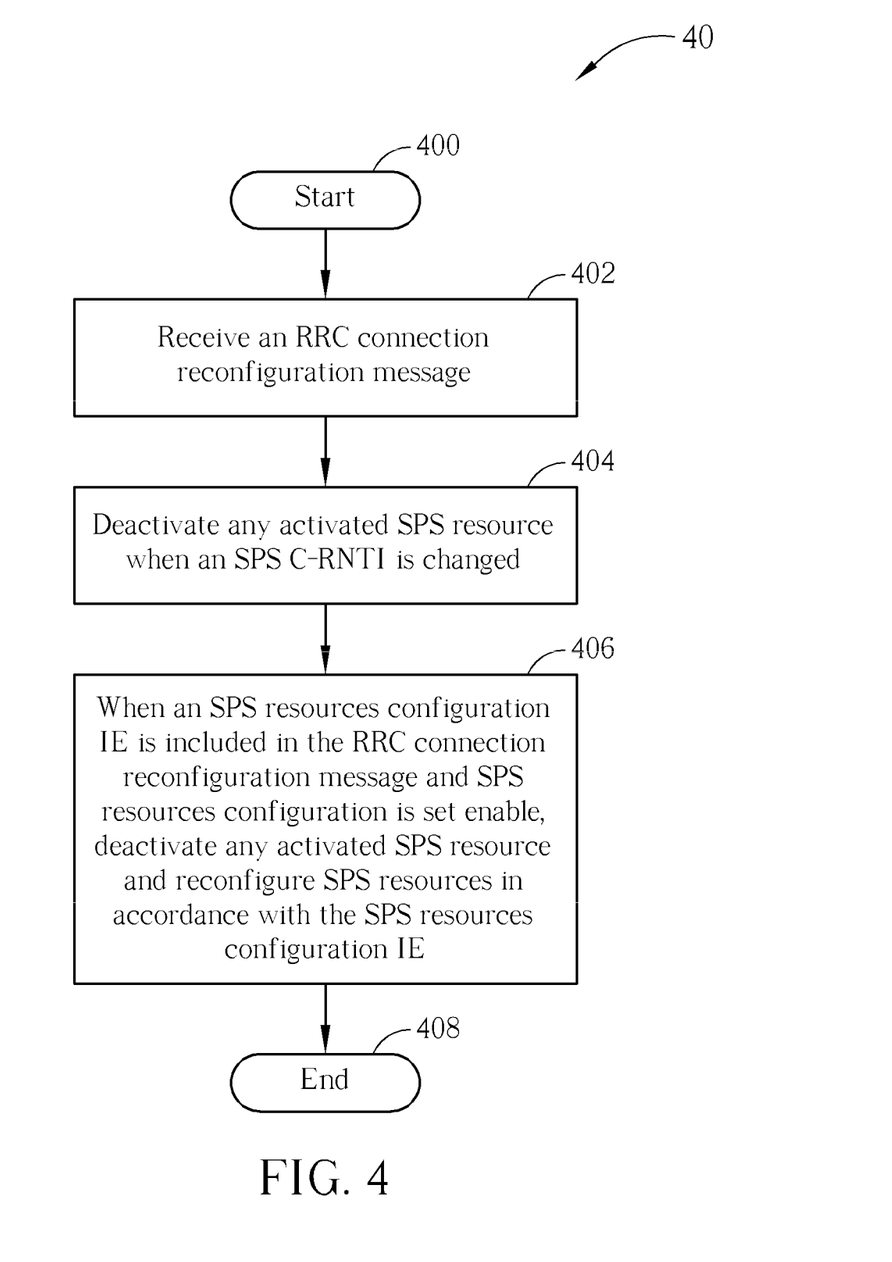

Please further refer to FIG. 4, which is a flowchart of a process 40 according to an example of the present invention. Similar to the process 30, the process 40 is also utilized for improving SPS resources reconfiguration for the UE, especially for overcoming the timing issue that the UE may decode transport blocks unsuccessfully by using SPS resources that are already released. The process 40 can be compiled into the program code 214. The process 40 includes the following steps:

Step 400: Start.

Step 402: Receive an RRC connection reconfiguration message.

Step 404: Deactivate any activated SPS resource when an SPS C-RNTI is changed.

Step 406: When an SPS resources configuration IE is included in the RRC connection reconfiguration message and SPS resources configuration is set enable, deactivate any activated SPS resource and reconfigure SPS resources in accordance with the SPS resources configuration IE.

Step 408: End.

The process 40 is also utilized in downlink and uplink SPS resources reconfiguration. The distinction between the process 40 and the process 30 is that the UE deactivates any activated SPS resource before reconfiguring SPS resources according to the SPS resources configuration IE, which is identical to Step 304 of the process 30. Besides, the UE deactivates any activated SPS resource when the SPS C-RNTI is changed. Therefore, the UE does not use the prior SPS resources configuration to decode transport blocks anymore during the time between SPS resources reconfiguration completion and the PDCCH signaling arrival, so that unsuccessful decoding is avoided. As to detail description of the process 40, please refer to the mentioned previously and are not repeated. The prior art reveals the timing issue that the UE may decode transport blocks unsuccessfully because the UE does not know activation time of new SPS sources configuration; in comparison, the process 40 deactivates any activated SPS resource before SPS resource reconfiguration, so that the timing issue is avoided.

Figure 5:
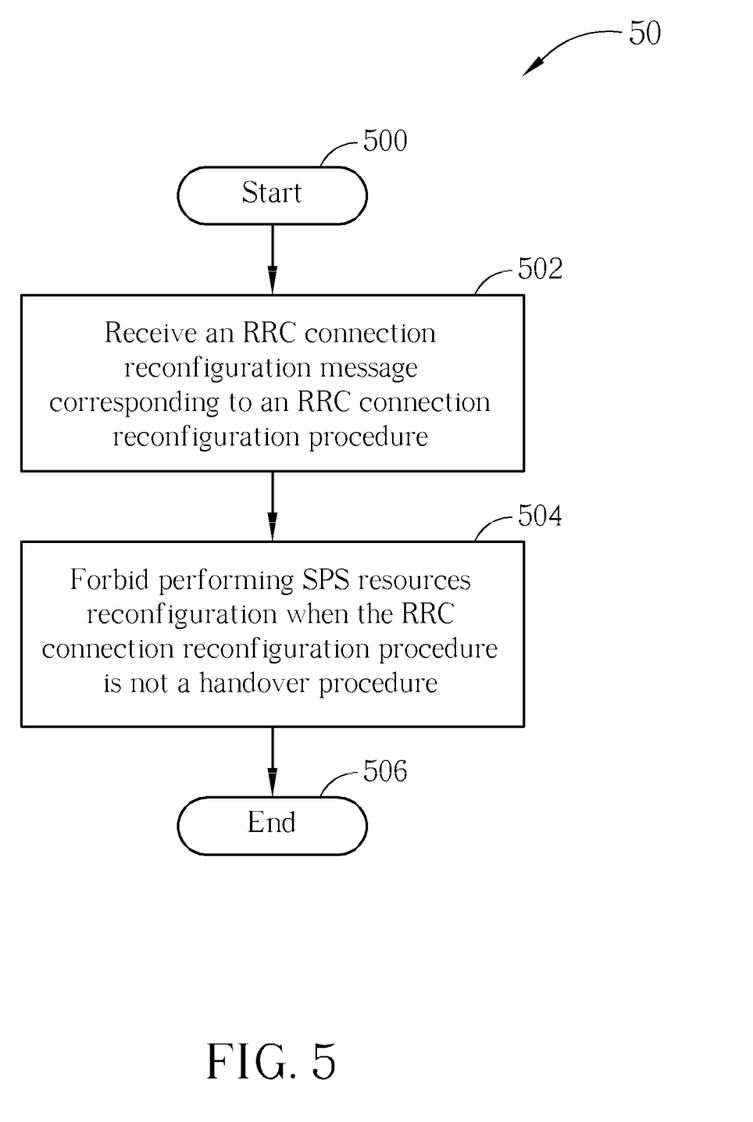

Besides, the present invention provides another method easier than the process 40 to solve the timing issue. Please refer to FIG. 5, which is a flowchart of a process 50 according to an example of the present invention. The process 50 is also utilized for improving SPS resources reconfiguration and can be compiled into the program code 214. The process 50 includes the following steps:

Step 500: Start.

Step 502: Receive an RRC connection reconfiguration message corresponding to an RRC connection reconfiguration procedure.

Step 504: Forbid performing SPS resources reconfiguration when the RRC connection reconfiguration procedure is not a handover procedure.

Step 506: End.

For the reason that the UE may decode transport blocks unsuccessfully when SPS resources reconfiguration is not exactly performed in the non-handover RRC connection reconfiguration procedure, the process 50 simply forbids performing SPS resources reconfiguration when the RRC connection reconfiguration procedure is not a handover procedure, and therefore the timing issue is avoided. In other words, the process 50 allows SPS resources reconfiguration to be performed only in the handover procedure. Note that in current specification, whether the RRC connection reconfiguration procedure is the handover procedure depends on the received RRC connection reconfiguration message including the IE "mobilityControlInformation" or not.

Figure 6:
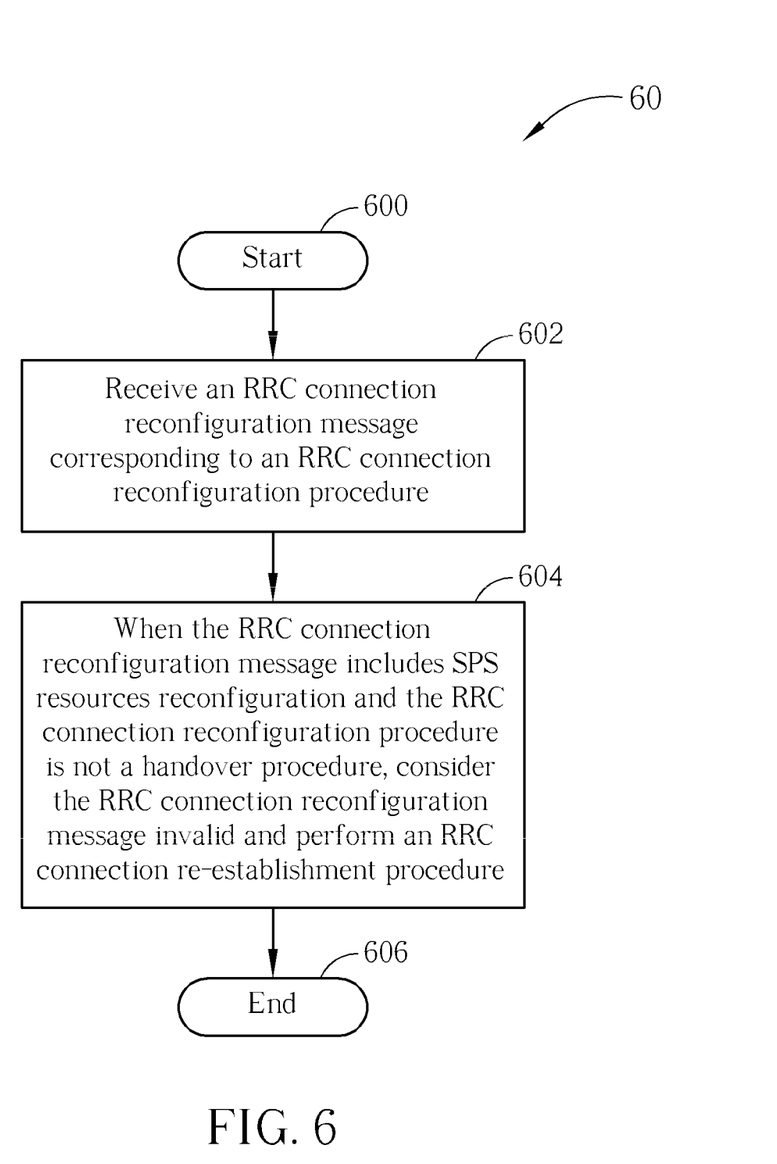

Furthermore, please refer to FIG. 6, which is a flowchart of a process 60 according to an example of the present invention. The process 60, similar to the process 50, aims to prevent SPS resources reconfiguration being performed in the non-handover RRC connection reconfiguration procedure. The process 60 can be compiled into the program code 214, which includes the following steps:

Step 600: Start.

Step 602: Receive an RRC connection reconfiguration message corresponding to an RRC connection reconfiguration procedure.

Step 604: When the RRC connection reconfiguration message includes SPS resources reconfiguration and the RRC connection reconfiguration procedure is not a handover procedure, consider the RRC connection reconfiguration message invalid and perform an RRC connection re-establishment procedure.

Step 606: End.

According to the process 60, when the received RRC connection reconfiguration message includes SPS resources reconfiguration and does not include the IE "mobilityControlInformation", which intends that the RRC connection reconfiguration procedure is not the handover procedure, the UE acts for preventing SPS resources reconfiguration being performed. The first thing the UE does is to consider the RRC connection reconfiguration message invalid, so that the RRC connection reconfiguration procedure is fail to complete; and later, the UE performs the RRC connection re-establishment procedure to re-establish RRC connection in order to recover the RRC connection reconfiguration failure.

In other words, the process 60 does not allow SPS resources reconfiguration being performed in the RRC connection reconfiguration procedure which is not the handover procedure even though the RRC connection reconfiguration message includes SPS resources reconfiguration. Thus SPS resources reconfiguration is performed only in the handover procedure.

In conclusion, the present invention provides complete behavior of SPS resources reconfiguration for the UE so that SPS resources reconfiguration is exactly performed in any case and the timing issue is avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving semi-persistent scheduling, abbreviated to SPS, resources reconfiguration for a user equipment in a wireless communication system, the method comprising:
   receiving a radio resource control, abbreviated to RRC, connection reconfiguration message; and
   reconfiguring downlink SPS resources in accordance with a downlink SPS resources configuration IE when the downlink SPS resources configuration IE is included in the RRC connection reconfiguration message and the downlink SPS resources configuration IE is set to enable;
   wherein any activated downlink SPS resource is deactivated when the downlink SPS resources are reconfigured; and the downlink SPS resource is activated when receiving a PDCCH signaling for activating downlink SPS resources.

2. The method of claim 1, further comprising deactivating any activated downlink SPS resource when an SPS cell radio network temporary identifier (SPS C-RNTI) is changed before the step of reconfiguring the downlink SPS resources in accordance with the downlink SPS resources configuration IE.

3. A communication device of a wireless communication system for improving semi-persistent scheduling, abbreviated to SPS, resources reconfiguration, the communication device comprising:
   a computer readable recording medium for storing program code corresponding to a process; and
   a processor coupled to the computer readable recording medium, for processing the program code to execute the process, wherein the process comprises:
      receiving a radio resource control, abbreviated to RRC, connection reconfiguration message; and
      reconfiguring downlink SPS resources in accordance with a downlink SPS resources configuration IE when the downlink SPS resources configuration IE is included in the RRC connection reconfiguration message and the downlink SPS resources configuration IE is set to enable;
      wherein any activated downlink SPS resource is deactivated when the downlink SPS resources are reconfigured; and the downlink SPS resource is activated when receiving a PDCCH signaling for activating downlink SPS resources.

4. The communication device of claim 3, wherein the process further comprises deactivating any activated downlink SPS resource when an SPS cell radio network temporary identifier (SPS C-RNTI) is changed before the step of reconfiguring the downlink SPS resources in accordance with the downlink SPS resources configuration IE.

5. A method of improving semi-persistent scheduling, abbreviated to SPS, resources reconfiguration for a user equipment in a wireless communication system, the method comprising:
   receiving a radio resource control, abbreviated to RRC, connection reconfiguration message; and
   reconfiguring uplink SPS resources in accordance with an uplink SPS resources configuration IE when the uplink SPS resources configuration IE is included in the RRC connection reconfiguration message and the uplink SPS resources configuration IE is set to enable;
   wherein any activated uplink SPS resource is deactivated when the uplink SPS resources are reconfigured; and the uplink SPS resource is activated when receiving a PDCCH signaling for activating uplink SPS resources.

6. The method of claim 5, further comprising deactivating any activated uplink SPS resource when an SPS cell radio network temporary identifier (SPS C-RNTI) is changed before the step of reconfiguring the uplink SPS resources in accordance with the uplink SPS resources configuration IE.

7. A communication device of a wireless communication system for improving semi-persistent scheduling, abbreviated to SPS, resources reconfiguration, the communication device comprising:
   a computer readable recording medium for storing program code corresponding to a process; and
   a processor coupled to the computer readable recording medium, for processing the program code to execute the process, wherein the process comprises:
      receiving a radio resource control, abbreviated to RRC, connection reconfiguration message; and
      reconfiguring uplink SPS resources in accordance with a uplink SPS resources configuration IE when the uplink SPS resources configuration IE is included in the RRC connection reconfiguration message and the uplink SPS resources configuration IE is set to enable;
      wherein any activated uplink SPS resource is deactivated when the uplink SPS resources are reconfigured; and the uplink SPS resource is activated when receiving a PDCCH signaling for activating uplink SPS resources.

8. The communication device of claim 7, wherein the process further comprises deactivating any activated uplink SPS resource when an SPS cell radio network temporary identifier (SPS C-RNTI) is changed before the step of reconfiguring the uplink SPS resources in accordance with the uplink SPS resources configuration IE.

* * * * *